United States Patent

Leith

(12) 
(10) Patent No.: US 6,173,628 B1
(45) Date of Patent: Jan. 16, 2001

(54) MULTI-PIECE CRANKSHAFT CONSTRUCTION

(75) Inventor: Donald G. Leith, West Bloomfield, MI (US)

(73) Assignee: Panther Machine, Inc., Wixom, MI (US)

( * ) Notice: Under 35 U.S.C. 154(b), the term of this patent shall be extended for 0 days.

(21) Appl. No.: 09/065,155

(22) Filed: Apr. 23, 1998

(51) Int. Cl.[7] ............ F16C 3/04; F16C 11/00; B25G 3/34
(52) U.S. Cl. ............ 74/598; 74/595; 403/269; 403/306; 29/888.08
(58) Field of Search ............ 74/595–598, 603, 74/579 R, 579 E, 572, 573 R; 29/888.08, 428, 6; 123/197.4, 197.2, 197.3; 464/179; 403/350, DIG. 8, 305, 306, 314, 361, 271, 273, 269

(56) References Cited

U.S. PATENT DOCUMENTS

| | | | |
|---|---|---|---|
| 2,364,109 | 12/1944 | Taylor | 29/6 |
| 4,191,238 * | 3/1980 | Pichl | 74/579 E X |
| 4,265,388 * | 5/1981 | Takahashi et al. | 228/135 |
| 4,319,498 * | 3/1982 | McWhorter | 74/595 |
| 4,382,390 * | 5/1983 | Jordan | 74/567 |
| 4,406,590 * | 9/1983 | Kessler | 123/197.4 |
| 4,493,226 | 1/1985 | Andrione et al. | 74/598 |
| 4,494,286 * | 1/1985 | Kaufman | 74/579 E X |
| 4,597,365 * | 7/1986 | Madaffer | 123/90.6 |
| 4,641,546 | 2/1987 | Mettler | 74/598 |
| 4,835,832 * | 6/1989 | Arnold et al. | 29/523 |
| 4,838,116 | 6/1989 | Saito et al. | 74/595 |
| 5,088,345 | 2/1992 | Kemmler et al. | 74/598 |
| 5,207,120 * | 5/1993 | Arnold et al. | 74/595 |
| 5,293,684 * | 3/1994 | Fry | 29/888.08 |
| 5,857,915 * | 1/1999 | Leith | 464/179 |

FOREIGN PATENT DOCUMENTS

| | | | |
|---|---|---|---|
| 364371 * | 11/1922 | (DE) | 74/595 |
| 422828 * | 12/1925 | (DE) | 74/595 |
| 542056 * | 1/1932 | (DE) | 74/595 |
| 663563 * | 8/1938 | (DE) | 74/598 |
| 822036 * | 11/1951 | (DE) | 74/595 |
| 891641 * | 10/1953 | (DE) | 74/595 |
| 1270893 * | 6/1968 | (DE) | 74/595 |
| 0530890 * | 3/1993 | (EP) | 74/603 |
| 763668 * | 5/1934 | (FR) | 74/598 |

* cited by examiner

*Primary Examiner*—Vinh T. Luong
(74) *Attorney, Agent, or Firm*—Gifford, Krass, Groh, Sprinkle, Anderson & Citkowski, P.C.

(57) ABSTRACT

A multi-piece crankshaft having a main shaft with two ends adapted to rotate about its axis. A crankpin also has two ends and an axis parallel to but radially spaced from the axis of the main shaft. At least one counterweight extends between one end of the shaft and one end of the crankpin and this counterweight is formed by casting a liquid metal around the ends of the main shaft and crankpin in a molding chamber.

4 Claims, 2 Drawing Sheets

MULTI-PIECE CRANKSHAFT CONSTRUCTION

BACKGROUND OF THE INVENTION

I. Field of the Invention

The present invention relates generally to crankshafts and, more particularly, to a method and apparatus for constructing a multi-piece crankshaft.

II. Description of the Prior Art

In a conventional crankshaft, the crankshaft includes a segmented main shaft having an axis aligned with the axis of rotation of the crankshaft. One or more crankpins are also provided at a position radially spaced from, but parallel to, the main shaft. The piston is then secured to each crankpin which rotatably drives the crankshaft about its axis of rotation.

Since the crankpins are radially offset from the axis of rotation of the crankshaft and attached to a piston, counterweights are conventionally provided for securing the main shaft to the crankpins so that the overall crankshaft has a balanced rotation. In many previously known crankshafts, the entire crankshaft is made from a single heavy body of cast metal which is then machined so that the main shaft, crankpins and counterweights are of a one piece construction. Machining such crankshafts, however, is necessarily expensive which increases the overall cost of the crankshaft.

There have, however, been crankshafts which are constructed from multiple pieces for low cost construction. Such crankshafts are oftentimes used in small two cycle engines although they can be used in other types of engines or compressors.

Typically, the counterweights are constructed from an inexpensive material, such as powdered metal or steel stampings, and the counterweight has holes formed through it corresponding to the position of the crankpin and main shaft. The crankpin and main shaft are then constructed from conventional round stock. The ends of the main shaft and crankpins are knurled, splined or otherwise deformed and pressed into the openings formed in the counterweight to thereby form the crankshaft.

One primary disadvantage of these previously known multi-piece crankshafts is that the main shaft and crankpins must be parallel to each other within very high tolerances. However, during the pressing operation, the main shaft and crankpins often become skewed relative to each other and the resulting crankshaft assembly must be either corrected by bending the crankpin and main shaft relative to each other or, in some cases discarded as scrap. Furthermore, these prior art crankshafts were also subject to failure from push out and twisting of the shaft relative to the counterweight.

SUMMARY OF THE PRESENT INVENTION

The present invention provides a multi-piece crankshaft assembly and method for making the same which overcomes all of the above-mentioned disadvantages of the previously known multi-piece crankshaft constructions.

In brief, the crankshaft assembly of the present invention comprises a crankpin and a main shaft, both of which are cylindrical in cross-sectional shape. One end of both of the main shaft and crankpin includes an indentation, such as spline, knurling or the like.

The crankpin and main shaft are then placed in cylindrical positioning recesses in a mold having a mold cavity corresponding to the desired shape of the counterweight. With the crankpin and main shaft positioned within the mold positioning recesses, the ends of the crankpin and main shaft which includes the indentation are in registration with the mold cavity corresponding to the counterweight. Furthermore, the positioning recesses in the mold are machined with high precision which ensures parallelism between the main shaft and crankpin within the mold.

With the crankpin and main shaft positioned within the mold as described above, the mold cavity corresponding to the counterweight is then filled by pouring, injection or the like with a liquid thermosetting material, such as zinc. This liquid material not only fills the mold cavity but also the indentations in both the crankpin and main shaft. Consequently, upon hardening of the material, the material fills the indentations in the crankpin and main shaft thus precluding either rotational or longitudinal movement between the counterweight and both the crankpin and main shaft.

Since the main shaft and crankpin are maintained parallel to each other within very small tolerances, once the liquid material has set, parallelism between the crankpin and main shaft is established for the completed crankshaft assembly.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENT OF THE PRESENT INVENTION

Figure 1:
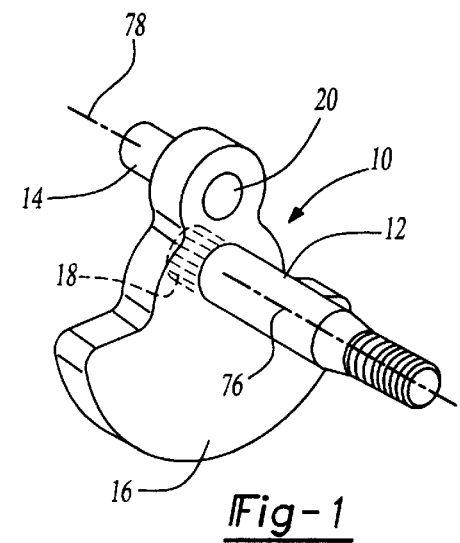
FIG. 1 is an elevational view illustrating a preferred embodiment of the present invention.

With reference first to FIG. 1, a preferred embodiment of a crankshaft 10 of the present invention is there shown and comprises an elongated main shaft 12 adapted to rotate about its longitudinal axis 76. The crankshaft 10 further includes a crankpin 14 having a longitudinal axis 78 parallel to but radially spaced from the main shaft 12.

Still referring to FIG. 1, a counterweight 16 extends between one end 18 of the main shaft 12 and one end 20 of the crankpin 14. The counterweight 16 secures the crankpin 14 and main shaft 12 together in the well known fashion.

Figure 2:
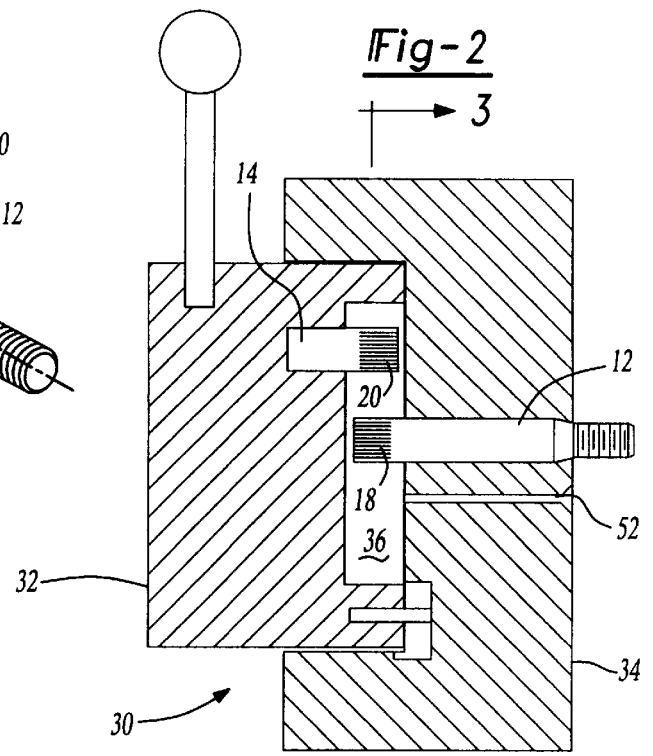
FIG. 2 is a sectional view illustrating a first step in constructing the preferred embodiment of the present invention.
Figure 3:
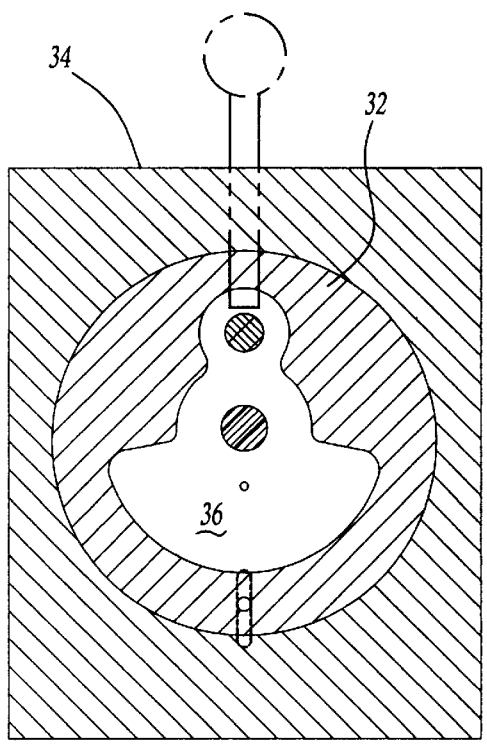
FIG. 3 is a cross-sectional view taken along line 3—3 in FIG. 2.
Figure 4:
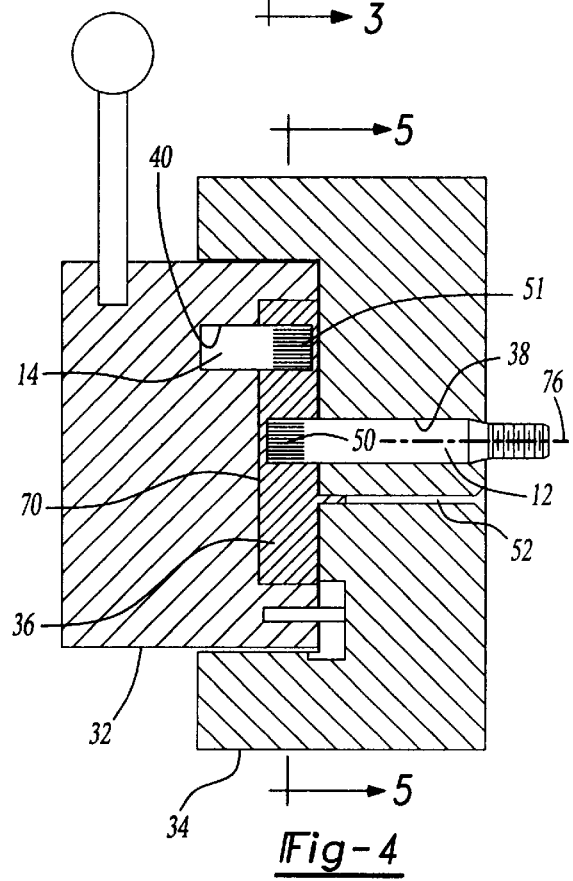
FIG. 4 is a view similar to FIG. 2, but illustrating a further step of the preferred method.

With reference now to FIGS. 2–4, the crankshaft 10 of the present invention is formed by casting the counterweight 16 from a thermosetting material 70 and preferably from liquid metal, such as zinc, around registering ends 20 and 18 of both the crankpin 14 and main shaft 12. As best shown in FIG. 2, a mold 30 having two mold halves 32 and 34 is provided which are movable between their closed position, illustrated in solid line in FIG. 2, and their opened position, illustrated in phantom line in FIG. 2. With the mold sections 32 and 34 in their closed position (FIG. 3) the mold sections 32 and 34 form a mold cavity 36 corresponding in shape to the counterweight 16.

Figure 5:
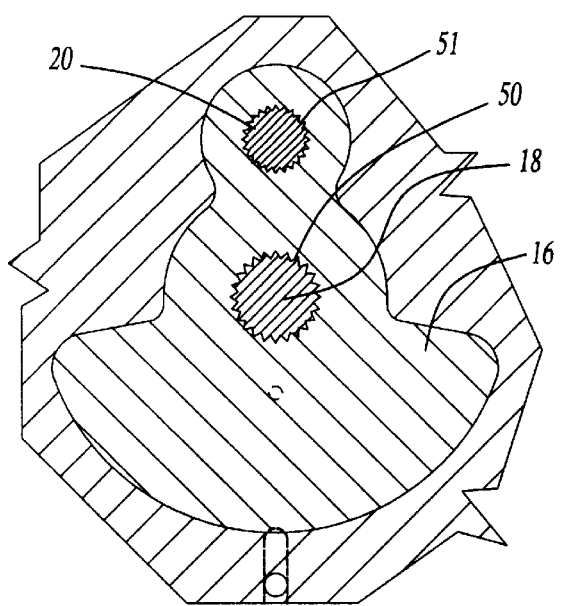
FIG. 5 is a sectional view taken substantially along line 5—5 in FIG. 4 and enlarged for clarity.

As best shown in FIG. 5, each mold section 32 and 34 (only section 34 illustrated in FIG. 4) includes an elongated cylindrical positioning recess 38 dimensioned to receive and position the main shaft 12 within the mold 30 such that its end 18 is in registration with the mold cavity 36. Similarly, a second elongated cylindrical recess 40 is also provided in each mold section 32 and 34 and these recesses 40 are dimensioned to receive and position the crankpin 14 such that its end 20 is also positioned in registration with the mold cavity 36.

The recesses 38 and 40 for positioning the main shaft 12 and crankpin 14, respectively, are machined in the mold sections 32 and 34 such that the recesses 38 and 40 are parallel to each other within very small tolerances. Furthermore, as best shown in FIG. 3, the mold section 32 is generally cylindrical in shape and pivotal about the axis of the main shaft 12 for a reason to be shortly described.

Figure 7:
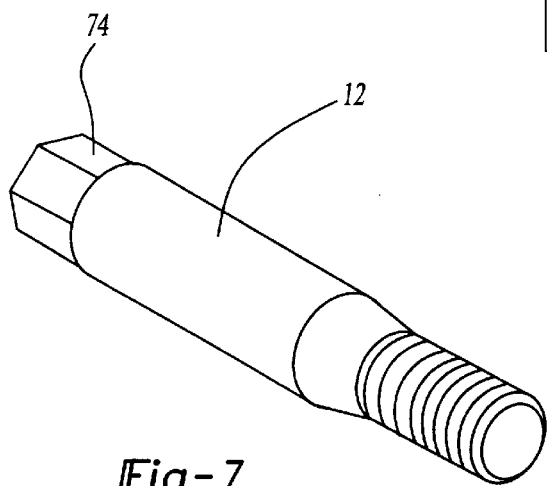
FIG. 7 is a view of a shaft, but illustrating a modification thereof.

With reference now to FIG. 5, the ends 18 of the main shaft 12 includes at least one indentation 50. The indentation 50 can comprise, for example, splines, a knurled portion, a polygonal cross-section 74 as shown in FIG. 7 or the like. However, at least one portion of the circular outer periphery of the end 18 of the main shaft 12 is non-circular in shape.

The end 20 of the crankpin 14 also has at least one indentation 51 (FIG. 5) which is similar to indentation 50 on the main shaft 12. Thus a further description thereof is unnecessary.

With the main shaft 12 and crankpin 14 positioned in the mold sections 32 and 34 as shown in FIG. 2, a liquid thermosetting material 70, such as liquid metal, is introduced through a sprue 52 such that the liquid material, preferably zinc, fills the mold chamber 36 which corresponds in shape to the counterweight 16. Any conventional means, such as pouring, injection molding or the like can be used to introduce the liquid material into the chamber 36. Furthermore, as shown in FIG. 4, the liquid material not only encases the registering ends 18 and 20 of the main shaft 12 and crankpin 14, respectively, but the liquid material 70 also flows into the indentations 50 and 51 formed in the shaft and crankpin ends 18 and 20. A small amount of material also hardens in the sprue 52 next to the mold chamber 36.

Figure 6:
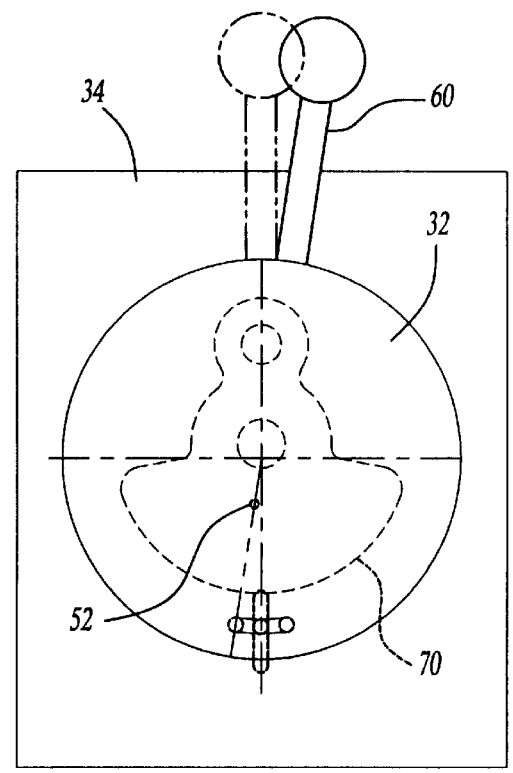
FIG. 6 is a diagrammatic view illustrating a further step in the preferred method.

With reference to FIG. 6, once the liquid material has set or cooled, a handle 60 attached to the mold section 32 pivots the mold section 32, as shown in phantom line, relative to the mold section 34 and in doing so, breaks the thermoset material contained in the sprue 52 from the counterweight 16. The mold sections 32 and 34 are again opened (FIG. 2) thus allowing the now completed crankshaft 10 to be removed from the mold 30. Furthermore, since the main shaft 12 and crankpin 14 were maintained parallel to each other during the entire molding operation, parallelism between the main shaft 12 and crankpin 14 is ensured upon completion of the crankshaft assembly.

The provision of the indentation(s) 50 and 51 on the ends 18 and 20 of the main shaft 12 and crankpin 14, respectively, ensures against movement, either rotational or longitudinal, of the main shaft 12 and crankpin 14 relative to the counterweight 16 during operation of the crankshaft 10.

From the foregoing, it can be seen that the present invention provides both a crankshaft and a method for constructing a crankshaft which is not only inexpensive, but also ensures a high degree of parallelism between the main shaft and crankpin upon completion of the assembly.

Having described my invention, however, many modifications thereto will become apparent to those skilled in the art to which it pertains without deviation from the spirit of the invention as defined by the scope of the appended claims.

I claim:

1. A crankshaft comprising:

a shaft solid in cross section and having two ends and an axis, said shaft adapted to rotate about said shaft axis, a crankpin solid in cross section and having two ends and an axis parallel to and radially spaced from the shaft axis, said crankpin having at least one indentation, at least one counterweight extending between one end of said shaft and one end of said crankpin, said counterweight being formed by casting a liquid metal around said one ends of said shaft and crankpin wherein said liquid metal fills said indentation and, upon hardening, locks said counterweight to said crankpin.

2. The invention as defined in claim 1 wherein each said indentation comprises at least one spline.

3. The invention as defined in claim 1 wherein said one ends of said shaft and crankpin are knurled.

4. The invention as defined in claim 1 wherein said counterweight is constructed of zinc.

* * * * *